(No Model.)

C. M. CONRADSON.
SPLIT WHEEL.

No. 482,864. Patented Sept. 20, 1892.

Fig. 4. on y-y.   Fig. 5. on z-z.

Witness:
James F. Duhamel.
Horace A. Dodge.

CONRAD M. CONRADSON,
Inventor,
by Dodge Sons,
Attys.

THE NORRIS PETERS CO., PHOTO-LITHO., WASHINGTON, D. C.

UNITED STATES PATENT OFFICE.

CONRAD M. CONRADSON, OF MADISON, WISCONSIN.

SPLIT WHEEL.

SPECIFICATION forming part of Letters Patent No. 482,864, dated September 20, 1892.

Application filed December 26, 1891. Serial No. 416,115. (No model.)

*To all whom it may concern:*

Be it known that I, CONRAD M. CONRADSON, a citizen of the United States, residing at Madison, in the county of Dane and State of Wisconsin, have invented certain new and useful Improvements in Split Wheels, of which the following is a specification.

My invention relates to the manufacture of split gearing or split pulleys; and it consists in various features hereinafter set forth and claimed.

Figure 1:
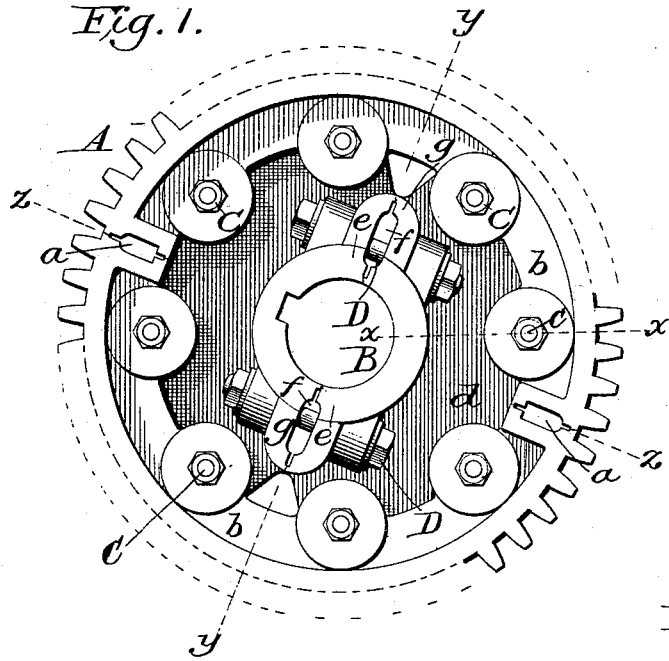
Figure 3:
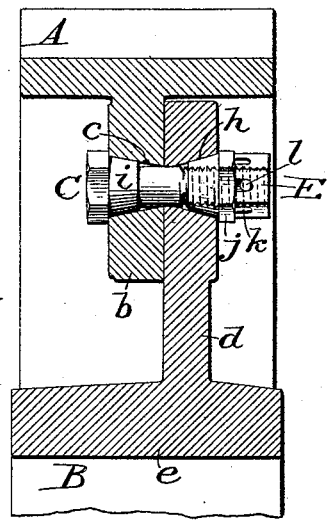
Figure 2:
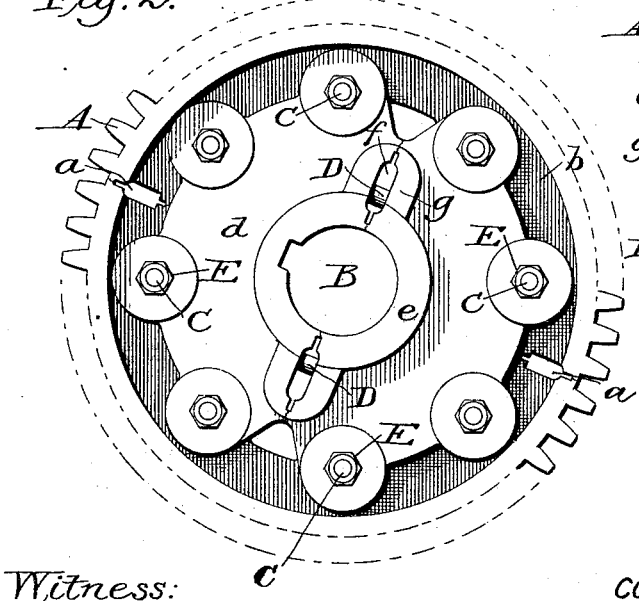
Figure 2:
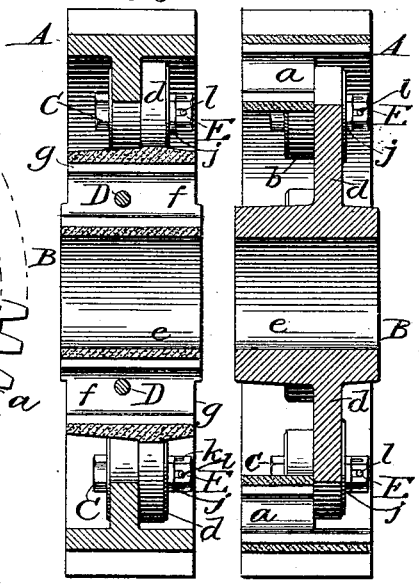

In the drawings, Figure 1 is a face view of a gear-wheel constructed in accordance with my invention; Fig. 2, a similar view, but from the reverse side or face; Fig. 3, an enlarged sectional view on the line $x\,x$ of Fig. 1; Fig. 4, a sectional view on the line $y\,y$, and Fig. 5 a sectional view on the line $z\,z$.

A indicates the rim of the wheel, and B the hub or body, which is made separate from the rim, but rigidly connected therewith. This rim A is preferably cast in one piece and cored out or formed with pockets $a$, Figs. 1, 2, and 5, into which are introduced wedges or equivalent devices for the purpose of splitting or cracking the rim, so as to divide it into any desired number of pieces or sections upon lines substantially radial. The rim is further provided with an internal annular flange $b$, which is provided at predetermined points with conical holes or openings $c$ to receive the fastening-bolts C, hereinafter more fully referred to.

The hub or body B comprises a disk portion $d$, having a central bore or opening to receive the shaft, and also having bosses $e$ around said opening on both faces of the disk, as shown in Figs. 1, 2, 3, and 4, the whole preferably consisting of a single casting. When thus made, the hub or body is cored out or provided with pockets or openings $f$ for the insertion of wedges, by means of which the casting is split or cracked on lines substantially radial.

To obviate the necessity of cracking or splitting across the entire face of the disk portion $d$, the latter will be provided with two V-shaped notches in its edge, the apex of each notch meeting the pockets on the line on which it is desired that the disk shall divide.

The two parts or sections of the hub or body B are adapted to be secured to each other upon the shaft by means of bolts D, which, as shown in Figs. 1 and 4, pass through the ears $g$ of the bosses.

In lieu of casting the hub or body in one piece and subsequently cracking or splitting it, it may be made in the same form, but of two separate sections having their meeting edges dressed off to insure a perfect union and then bolted together by means of bolts passing through the ears. So, too, with regard to the rim, it may, if desired, be made in two separate sections suitably dressed at their meeting edges and may or may not be adapted to be bolted together; but this bolting together of the rim-sections is not essential, as they are bolted to the hub or body by the bolts C and prevented from getting out of position.

The hub or body portion is provided with conical holes or openings $h$, corresponding in position and number with the holes $c$, formed in the flange $b$ of rim A, and into these holes fit the bolts C, which, as shown in Fig. 3, are each provided with a conical neck $i$.

Screwing onto the threaded end of bolt C is a conical nut $j$, which by fitting closely into the conical hole $h$ of flange $d$ draws the hub or body portion close against the face of the flange of the rim. In order to prevent the nut $j$ from becoming loose, I employ a lock-nut E, which is provided with holes or openings $k$, through which I pass a pin $l$, which is also driven through a hole in the bolt.

Whether the rim and the hub be each cast in one piece and subsequently split or made in sections and subsequently united, the plane of division of the rim should be at an angle, preferably at a right angle, to the plane of division of the hub or body portion, so that any tendency of the parts of the wheel to open shall be overcome and so, also, that the bolts used to bind the parts of the hub together will also serve to bind the parts of the rim together and render unnecessary the use of special bolts for the latter purpose. Either section of the rim can be removed without affecting the other section or the sections of the hub, while either section of the hub portion can be removed without affecting the rim-sections. Under this arrangement I secure greater ease in replacing parts and also greater rigidity in use, as well as a considerable economy in first cost.

When I speak of a "split rim" and a "split hub," I mean to include a rim and a hub each previously made in separate sections.

I am aware that it is old to cast the rim in two parts, each part having an integral half-hub, that it is old to make the rim and the hub each in two parts with the lines of division practically coincident, and that it is also old to make a gear-wheel of four sections, each pair of sections forming a complete gear and applied to the other pair with the line of division at an angle to that of the other pair, and to such constructions I make no claim.

Having thus described my invention, what I claim is—

In a split wheel, the combination, with a split rim, of a split hub arranged within the rim with its plane of division at an angle to the plane of division of the rim, with each hub-section overlapping parts of both rim-sections, and bolts or screws for uniting the rim-sections to the hub-sections, all substantially as shown and described, whereby the bolts serve to mutually support the rim and hub sections and the ready replacement of either of the rim and hub sections is permitted without removing the wheel from its shaft.

In witness whereof I hereunto set my hand in the presence of two witnesses.

CONRAD M. CONRADSON.

Witnesses:
C. H. ALLYN,
W. R. BAGLEY.